Sept. 26, 1933.  C. F. UEBELACKER  1,928,080
CENTRIFUGAL SEPARATOR
Filed Nov. 14, 1932

INVENTOR
CHARLES F. UEBELACKER
BY
Ritter, Mechlin & O'Neill
ATTORNEYS

Patented Sept. 26, 1933

1,928,080

UNITED STATES PATENT OFFICE 1,928,080

CENTRIFUGAL SEPARATOR

Charles F. Uebelacker, Hackensack, N. J.

Application November 14, 1932
Serial No. 642,651

11 Claims. (Cl. 210—64)

The invention relates to centrifugal separators of the continuous type, especially adapted for operating upon solid carrying fluids and comprises two coaxial, nested bowls having divergent sides and open ends with means for supplying the mixture to be centrifuged to the smaller end of the outer bowl, whereby the heavier solid material will be thrown against the wall of the outer bowl and extruded from the annular space between the inner and outer bowls and the liquid will be taken up by the inner bowl and discharged over the flared end thereof.

The invention is illustrated in the accompanying drawing, in which:—

Figure 1:
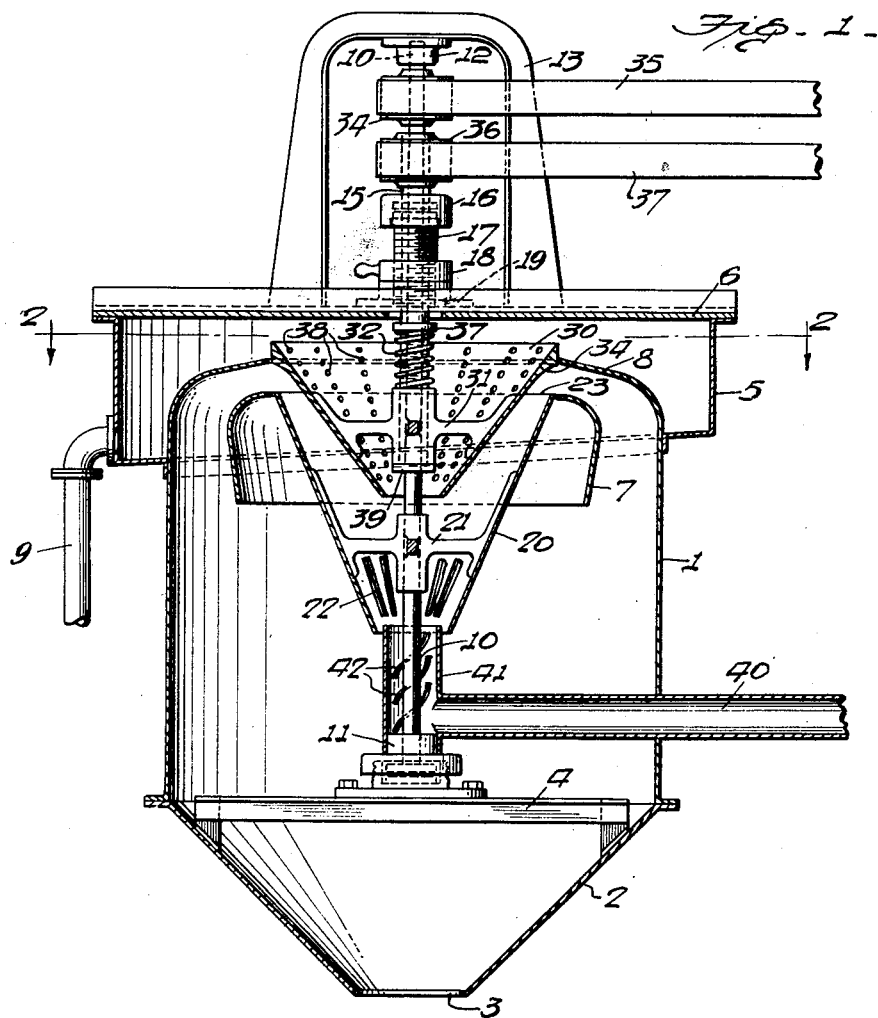
Figure 2:
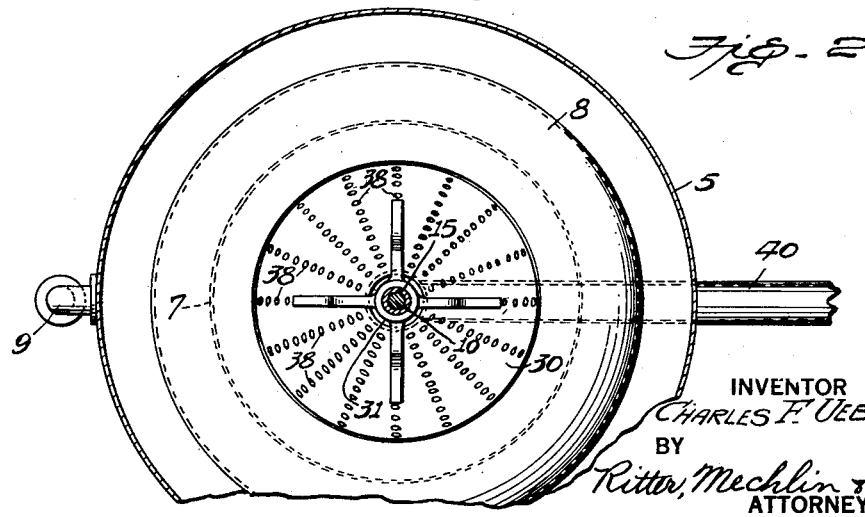

Fig. 1 is a sectional elevation of the machine.
Fig. 2 is a section on line 2—2 of Fig. 1.

Referring to the drawing, 1 indicates the main casing or shell of the machine provided with a hopper bottom 2 with a discharge outlet 3, the upper portion 8 of the casing 1 being generally dome-shaped and provided with a circular opening and the rim or peripheral edge of the opening surrounds and lies in close proximity to the upper marginal rim or periphery of an inner bowl or basket to be hereinafter described. Preferably, the main casing is provided with an inner curb 7 adapted to surround the upper marginal edge of an outer bowl or basket and to direct the discharge from the latter into the main casing and toward the bottom thereof for ultimate discharge through the opening 3. Mounted in the hopper bottom 2 is a platform 4 adapted to support one of the end bearings of the main shaft of the machine.

Preferably secured to the upper part of the casing 1 is a subsidiary casing or launder 5, which, in association with the dome-shaped portion 8 of the main casing, serves to collect and direct the separated liquid to a discharge conduit 9. The top of the auxiliary casing 5 is provided with a cover 6 which may conveniently serve as a support for the upper part of the apparatus including an intermediate bearing block 19 and yoke 13, which latter carries the other end bearing 12 of the main shaft of the machine.

Mounted in the lower thrust bearing 11 and the upper end bearing 12 is the main shaft 10 of the machine, which is in alignment with the vertical axis of the casing 1. Secured to the shaft 1 by means of a spider 21 is the outer bowl or basket 20 of the centrifugal machine, which bowl or basket, in the form shown, is a generally frusto-conical shell open at the top and bottom, with its upper marginal rim 23 lying adjacent the inner rim of the curb member 7. The inner wall of the bowl 20 adjacent the lower open end thereof is provided with vanes or ribs 22 designed to impart an initial rotary movement to the mixture fed to the bowl through the smaller open end thereof.

Associated with the outer bowl 20 is an inner bowl 30, which may be connected to or carried by the main shaft 10 by a spider 31, so that the two bowls are rotated at the same rate of speed, but, in order to admit of the operation of the bowls at different rates of speed, the inner bowl is carried by a quill shaft 15, surrounding the main shaft 10, said quill shaft being journaled in an intermediate bearing 17, provided with a thrust bearing 16 at its upper end, the intermediate bearing and the quill shaft carried thereby being vertically adjustable by means of a threaded collar 18 engaging external screw threads on the intermediate bearing 17 and abutting the intermediate bearing block 19. The purpose of the adjustment of this quill shaft is to permit the inner bowl 30 to be adjusted toward and from the outer basket 20 to thereby regulate the area of the discharge opening for the outer basket, as defined by the annular space between the walls of the inner and outer baskets.

It is also desired to impose on the solid constituents of the mixture operated upon by the centrifuge a definite compression as the solid material is being discharged from the outer bowl and, to this end, the pitch or angular inclination of the wall of the inner bowl is somewhat less than that of the outer bowl, so that the annular space between the walls of the two bowls is gradually restricted or reduced toward the discharge end of the outer bowl, the ultimate discharge of the outer bowl being between the rim 23 of the flaring end thereof and the adjacent wall of the inner bowl. This squeezing action on the solid material may be increased by providing the outer face of the inner bowl near its flared end with a curved surface or fillet 34. The object of the compressive force applied to the solid material, as the latter moves toward the discharge end of the outer bowl, is to force or squeeze the residual moisture in the solid material from the same, the extracted moisture passing to the inner bowl through perforations 38 distributed over the surface thereof. In order to exercise a constant pressure or resistance to the extrusion of the heavier material from the outer bowl 20, the inner bowl is preferably connected to the quill shaft to permit axial movement of the bowl on the shaft. This connection may take the form of a simple spline between the hub of the spider 31 and the quill shaft, the hub of the spider 31 being normally forced into engagement with a ring or shoulder 39 on the main shaft 10 by means of a helical spring 32 interposed between the spider and a collar or abutment 37 on the quill shaft 15. The main shaft 10 is provided with a pulley 34 engaged by a belt 35 and, similarly, the quill shaft 15 is provided with a pulley 36 driven by belt 37, the belts 35 and 37 being driven by any appropriate power connection, as will be understood.

The material to be separated is fed to the machine by a pipe or conduit 40, which passes into the main casing 1 above the platform 4 therein and is provided with an annular section 41 concentric with the main shaft and registering with the opening in the smaller end of the bowl. In order to impart an initial rotary movement to the material to be separated, the inner wall of the tubular inlet member 41 is provided with helical vanes 42.

As stated, the apparatus is designed especially to separate materials of different specific gravities continuously and more particularly to separate solid or semi-solid materials from liquids with which they are mixed, the heavier materials being forced by centrifugal force against the inner wall of the outer bowl and ultimately discharged over the rim thereof, the lighter liquid passing into the inner bowl through the open lower end thereof and being ultimately discharged over the upper flaring edge, whence it is directed by the dome-shaped section 8 of the casing 1 into the subsidiary casing 5, from which it is delivered by the discharge pipe 9. The mixture is delivered to the machine by the supply pipe 40 under sufficient pressure to force it into the lower open end of the outer basket 20, the vanes 42 on the inner wall of the vertical section 41 of the inlet conduit and the ribs or vanes 22 on the inner wall of the outer basket serving to impart a preliminary whirling motion to the mixture, thereby expediting the separation of the heavier element from the lighter liquid constituents. As the heavier solid material accumulates on the wall of the outer basket 20, it is forced into the gradually constricted area between the walls of the bowls, the squeezing action being effective to compress the solid material and extract, at least a part, of any residual moisture, the solid constituents being ultimately discharged over the upper edge or lip of the outer bowl, thence directed over the curb section 7 into the casing 10, where it may be permitted to accumulate or may be continuously discharged through the bottom outlet 3. The lighter or liquid portion of the mixture, which, under centrifugal action, accumulates near the axis of rotation of the bowls, enters the inner bowl 30 through the smaller open end thereof, and is ultimately discharged over the upper lip of said inner bowl into the upper casing or launder 5, thence through the discharge pipe 9. Any tendency of the solid material to clog in the restricted space between the inner and outer bowls will be relieved by the movement of the inner bowl in an axial direction on the quill shaft and against the force of the helical spring 32, but normally this spring exerts a uniform pressure on the solid material being extruded through the annular space between the rim 23 of the outer bowl and the adjacent surface of the inner bowl.

As hereinbefore described, the inner bowl may be adjusted axially with reference to the outer bowl, thereby regulating the annular space and the area of the discharge opening between the bowls, by proper adjustment of the intermediate bearing 17 and the threaded collar 18. As stated, the bowls may be rotated at the same rate of speed or they may be driven at different rates, depending upon the character of the material to be separated, and, when the bowls are rotated at differential speeds, the relative movement between the walls of the respective bowls will produce a rubbing action on the solid material being extruded, thereby further facilitating the extraction of any residual moisture in the solid material.

While the apparatus has been illustrated as applied with the coaxial, nested bowls with their larger ends at the top, it will be understood that this arrangement may be reversed and the bowls inverted, so that their smaller open ends will be at the top, in which case the material will be fed through the top of the machine. It will also be noted that, while the preferred form of the apparatus employs bowls of generally frusto-conical shape, they may be given any other appropriate form, provided they have flaring or divergent side walls so disposed as to form an annular space through which the heavier or solid elements of the mixture are extruded. It is also to be observed that any other suitable pressure applying device may be substituted for the spring 32.

What I claim is:

1. A centrifugal separator, comprising coaxial inner and outer bowls having open ends and divergent sides to provide a restricted discharge passage between the larger ends of the bowls, means for rotating the bowls, means for supplying the mixture to be separated to the smaller end of the outer bowl, and means for collecting the discharges from the respective bowls.

2. A centrifugal separator, comprising coaxial substantially frusto-conical bowls in nested relation to form a restricted discharge passage between the flared ends of the bowls the smaller ends of the bowls being open, means for rotating the bowls, means for supplying the mixture to be separated to the smaller end of the outer bowl, and means for collecting the discharges from the respective bowls.

3. A centrifugal separator, comprising an outer bowl having divergent sides and open ends, a coaxial inner bowl having divergent sides and open ends and disposed within the outer bowl to form a restricted discharge passage between the flared ends of said bowls, means for rotating the bowls, means for supplying the mixture to be separated to the smaller end of the outer bowl, and means for collecting the discharges from the respective bowls.

4. A centrifugal separator as described in claim 3, in which the inclination of the wall of the inner bowl to the axis is greater than that of the outer bowl so that the space between the inner and outer bowls decreases toward the discharge opening of the outer bowl.

5. A centrifugal separator as described in claim 3, in which the bowls are mounted on coaxial shafts provided with means for driving said shafts at any desired speed relation.

6. A centrifugal separator as described in claim 3, in which the bowls are mounted on coaxial shafts, the inner bowl being adjustable in an axial direction with respect to the outer bowl.

7. A centrifugal separator, comprising an outer bowl having divergent sides and open ends, a main shaft on which said bowl is mounted, a quill shaft coaxial with the main shaft, an inner bowl having divergent sides and open ends mounted on the quill shaft and extending partially within the outer bowl to provide a restricted passage between the walls of said bowls, means for supplying the mixture to be separated to the smaller end of the outer bowl, a casing enclosing the outer bowl and embracing the rim of the inner bowl, a supplemental casing to receive the discharge from the inner bowl, and means for driving said shafts.

8. A centrifugal separator as described in claim 7, in which the means for supplying the mixture comprises an inlet conduit coaxial in part with the smaller open end of the outer bowl and provided with interior vanes to impart initial rotary motion to the mixture.

9. A centrifugal separator, comprising coaxial inner and outer bowls having open ends and divergent sides forming a restricted discharge passage between the flared ends of the bowls, means for rotating the bowls, yielding means for holding the inner bowl within the outer bowl, means for rotating the bowls, and means for collecting the discharges from the respective bowls.

10. A centrifugal separator, comprising a main shaft, a quill shaft thereon, a substantially frusto-conical open ended bowl supported on the main shaft, an inner bowl having open ends supported on the quill shaft and having its wall so formed and disposed as to form a gradually restricted annular passage between it and the wall of the outer bowl, a casing surrounding the outer bowl and embracing the rim of the inner bowl, a supplemental casing to receive the discharge from the inner bowl, a supply conduit registering with the smaller end of the outer bowl, and means for driving the main and quill shafts.

11. A centrifugal separator, comprising coaxial inner and outer bowls having divergent sides and open ends, means for rotating said bowls, and means for supplying the mixture to be separated to the smaller end of the outer bowl, one of said bowls being movable in an axial direction and provided with pressure applying means to oppose the axial movement thereof.

CHARLES F. UEBELACKER.